United States Patent [19]

Okada et al.

[11] Patent Number: 4,651,209

[45] Date of Patent: Mar. 17, 1987

[54] TELEVISION DISPLAY SYSTEM WITH INCREASED FIELD FREQUENCY

[75] Inventors: Takashi Okada; Yasunari Ikeda, both of Shinagawa, Japan

[73] Assignee: Sony Corporation, Tokyo, Japan

[21] Appl. No.: 756,984

[22] PCT Filed: Nov. 7, 1984

[86] PCT No.: PCT/JP84/00532

§ 371 Date: Jul. 5, 1985

§ 102(e) Date: Jul. 5, 1985

[87] PCT Pub. No.: WO85/02312

PCT Pub. Date: May 23, 1985

[30] Foreign Application Priority Data

Nov. 7, 1983 [JP] Japan .................... 58-208740

[51] Int. Cl.[4] .............................. H04N 7/01
[52] U.S. Cl. ........................... 358/140; 358/148; 358/158; 358/188; 358/242
[58] Field of Search ............... 358/140, 148, 158, 188, 358/242

[56] References Cited

U.S. PATENT DOCUMENTS 4,322,750 3/1982 Lord ..................... 358/140
4,587,557 5/1986 Doornhein .............. 358/140

*Primary Examiner*—Howard W. Britton
*Attorney, Agent, or Firm*—Lewis H. Eslinger; Alvin Sinderbrand

[57] ABSTRACT

In accordance with the present invention, a read clock frequency applied to field memories (16a) and (16b) comprising a converting circuit (16) which converts the field frequency of a video signal is changed at the unit of a vertical cycle whereby vertical cycles of video signals read out from the field memories (16a) and (16b) are made substantially equal to one another. Accordingly, a horizontal deflecting current waveform on which a parabolic wave current of, for example, the vertical cycle is superposed becomes equal during each vertical period so that it becomes possible to prevent a jitter from being produced at right and left ends of a picture screen.

1 Claim, 13 Drawing Figures

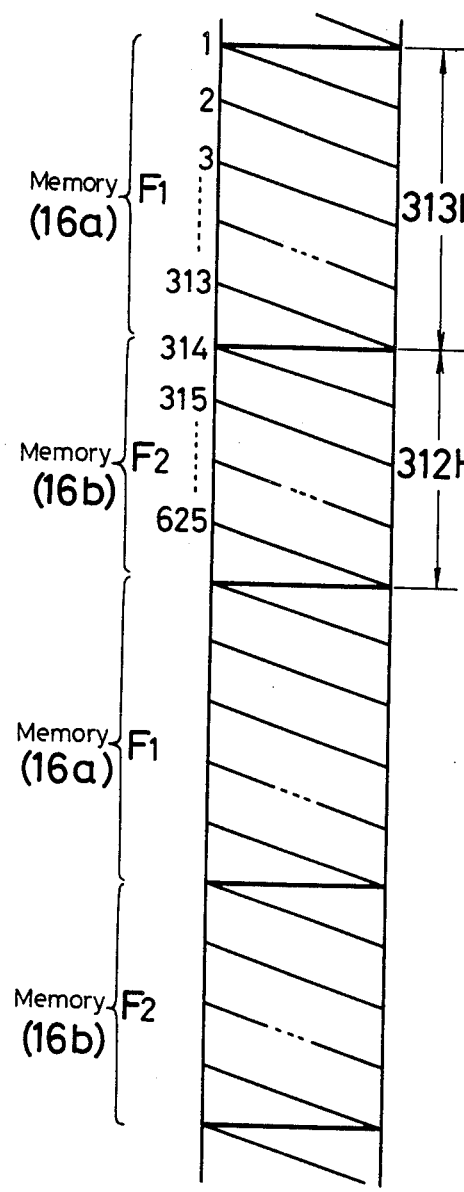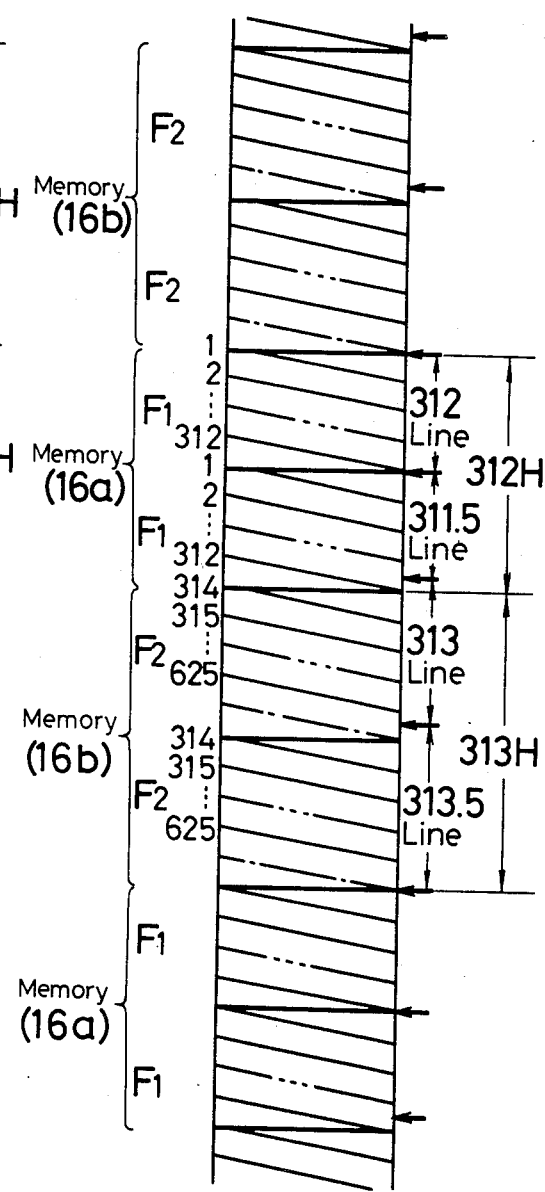

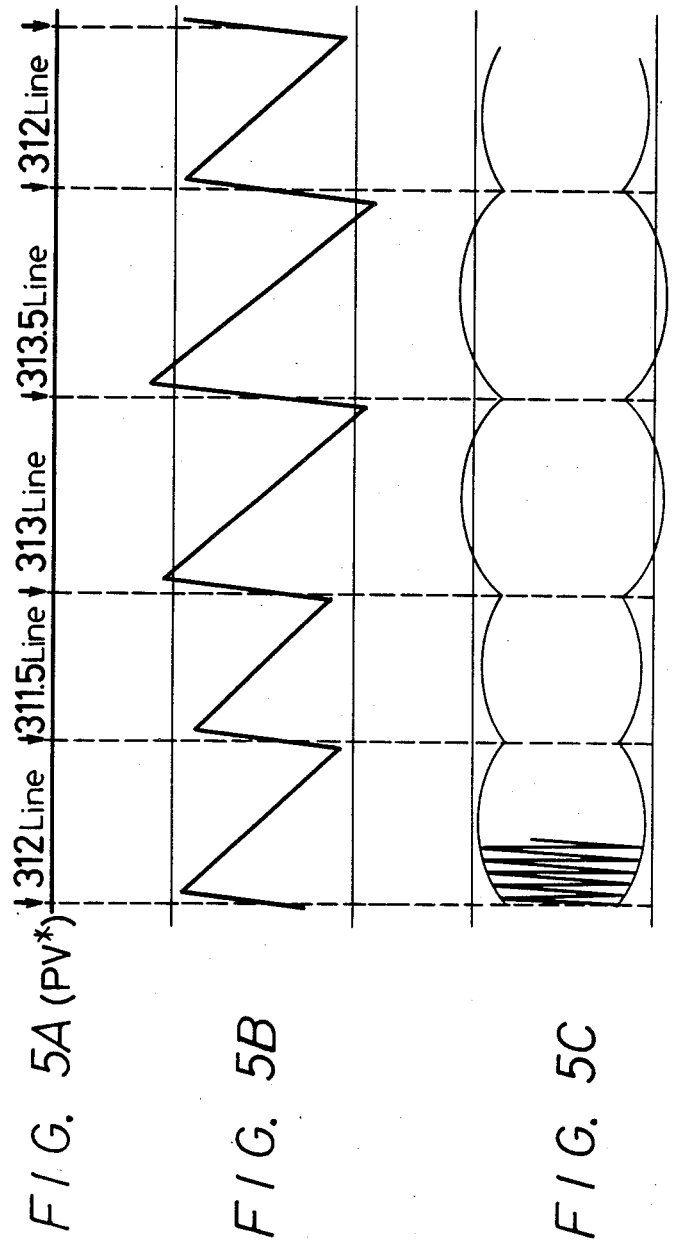

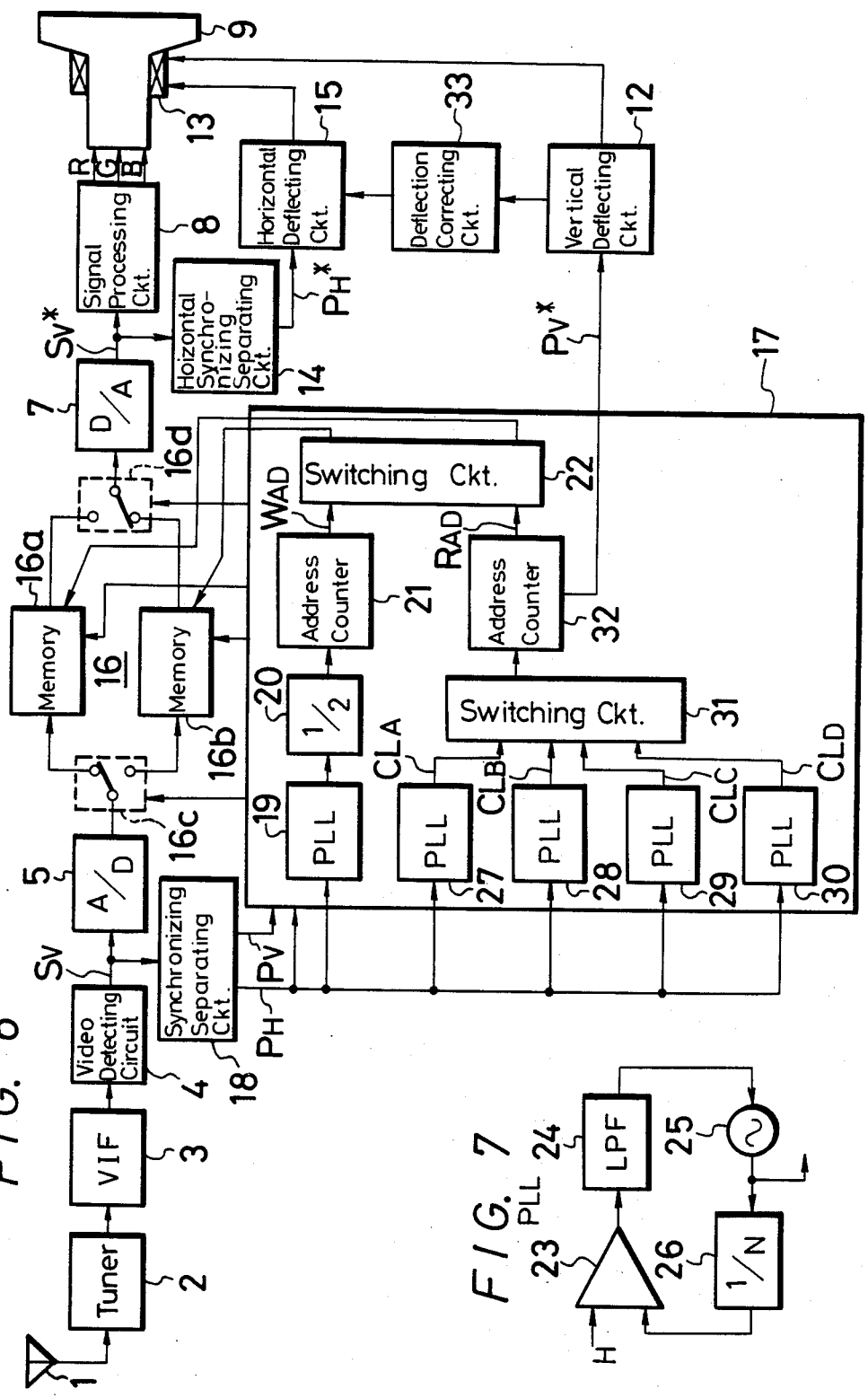

TELEVISION DISPLAY SYSTEM WITH INCREASED FIELD FREQUENCY

TECHNICAL FIELD

The present invention relates to a television receiver which displays a television picture at, for example, field frequency twice the normal field frequency.

BACKGROUND ART

In the existing television system, a so-called interlaced scanning system is carried out. That is, one picture (frame) is transmitted by two vertical scannings (fields). This interlaced scanning system is considered in order to increase the number of scanning lines as much as possible in a limited frequency band without a flicker being perceived by a viewer.

However, in the CCIR system employed mainly in European countries, the field frequency is 50 Hz. By this frequency, the flicker can not be removed completely and the flicker becomes conspicuous particularly when the brightness of the television picture is high.

Therefore, in the prior art, such a television receiver is proposed that a television picture is displayed at a field frequency twice the normal field frequency. FIG. 1 shows an example thereof.

In the figure, reference numeral 1 designates an antenna, 2 a tuner, 3 a video intermediate frequency amplifier, and 4 a video detecting circuit. The video detecting circuit 4 produces a video signal Sv of interlaced system of 625 lines/50 fields and 2:1.

This video signal Sv is converted to a digital signal by an A/D converter 5 and then fed to a converting circuit 6 so as to be converted to a field twice normal speed video signal with field frequency twice the normal field frequency.

The converting circuit 6 is formed of field memories (random access memories having a storage capacity of picture elements of one field period (1V)) 6a and 6b and switching circuits 6c and 6d. The switching circuit 6c is changed in position to the sides of the memories 6a and 6b at every field period 1V, while the switching circuit 6d is changed in position reversely. The memory selected by the switching circuit 6c is supplied with a write clock pulse having a timing corresponding to the above-described picture elements, while the memory selected by the switching circuit 6d is supplied with a read clock pulse with frequency twice the frequency of the write clock pulse.

The video signal Sv converted to the digital signal by the A/D converter 5 is supplied through the switching circuit 6c to the memories 6a and 6b by one field each at every field period 1V in which it is written. The video signal of one field amount, which is written in the memories 6b and 6a during a field period 1V just before the above-mentioned field period, is read out therefrom continuously twice with a cycle of ½ V. This video signal is derived through the switching circuit 6d. In other words, the switching circuit 6d delivers a field twice normal speed video signal Sv, that is, at a double field frequency.

This video signal Sv' is converted to an analog signal by a D/A converter 7 and then fed to a signal processing circuit 8. Then, from the signal processing circuit 8, red, green and blue primary color signals R, G and B are produced and then supplied to an image receiving tube 9, respectively.

The video signal Sv derived from the video detecting circuit 4 is supplied to a vertical synchronizing separating circuit 10. A vertical synchronizing signal Pv derived from the separating circuit 10 is multiplied twice by a frequency multiplier 11 to be a signal with frequency twice the ordinary frequency. This signal is supplied through a vertical deflecting circuit 12 to a deflecting coil 13.

The video signal Sv' derived from the D/A converter 7 is supplied to a horizontal synchronizing separating circuit 14. A horizontal synchronizing signal $P_H'$ (having the frequency twice the normal frequency) derived from the separating circuit 14 is supplied through a horizontal deflecting circuit 15 to the deflecting coil 13.

Since the example of the television receiver shown in FIG. 1 is constructed as described above, the primary color signals R, G and B each of which has the field frequency twice the normal field frequency are supplied to the picture receiving tube 9 and the horizontal and vertical deflection scannings are carried out at scanning speed twice the normal scanning speed, and hence a color picture with the field frequency twice the normal field frequency is displayed on the picture receiving tube 9. Accordingly, also in the above CCIR system, the field frequency becomes 100 Hz which is twice the normal field frequency so that the viewer feels no flicker.

In the case of the example shown in FIG. 1, however, the horizontal synchronization of the video signal Sv' derived from the converting circuit 6 is disturbed cyclically so that a distortion occurs in the upper portion of the picture screen.

That is, the write-in state of the video signal Sv derived from the video detecting circuit 4 in the memories 6a and 6b is expressed as shown in FIG. 2A, in which references $F_1$ and $F_2$ designate first and second fields, respectively. The video signal Sv' from the converting circuit 6 is expressed as shown in FIG. 2B. In the figure, arrows represent the positions of the vertical synchronizing signals. As will be clear from FIG. 2B, in the video signal Sv', the phase of the horizontal synchronization is displaced by 180° at every two fields, or at every 1/50 seconds (shown by broken line arrows), whereby the synchronization on the upper portion of the picture screen is disturbed, resulting in a picture distorion.

Therefore, the present applicant has proposed a television receiver which is free of such picture distortion and FIG. 3 shows an example thereof. In FIG. 3, like parts corresponding to those of FIG. 1 are marked with the same references.

In the figure, the video signal Sv derived from the video detecting circuit 4 is converted to the digital signal by the A/D converter 5 and then fed to a converting circuit 16 so as to be converted to the field twice normal speed video signal with the frequency twice the normal field frequency.

The converting circuit 16 is formed of field memories (random access memories) 16a and 16b having storage capacities of picture elements of 313 horizontal periods (313H) and 312 horizontal periods (312H) and switching circuits 16c and 16d. The switching circuit 16 is changed in position alternately to the side of the memory 16a during each period of 313H and to the side of the memory 16b during each period of 312H, while the switching circuit 16d is changed in position in the reverse manner. These change-overs of the change-over switches 16c and 16d are controlled by a control circuit 17. This control circuit 17 is supplied with horizontal and vertical synchronizing signals $P_H$ and $P_V$ which are separated from the video signal Sv by a synchronizing separating circuit 18.

The memory selected by the switching circuit 16c is supplied with the write clock pulse having the timing corresponding to the above picture elements, while the memory selected by the switching circuit 16d is supplied with a read clock pulse with the frequency twice the frequency of the write clock pulse.

The video signal Sv converted to the digital signal by the A/D converter 5 is supplied through the switching circuit 16c to the memories 16a and 16b in which it is alternately written during each period of 313H and 312H. FIG. 4A shows the write-in state of the memories 16a and 16b, in which references $F_1$ and $F_2$ represent the first and second fields, respectively. During the periods of 313H and 312H in which the video signal is being written in one of the memories, the video signal written in the other of the memories 16b and 16a during the periods just before the above 312H and 313H are read out therefrom twice continuously. This signal is derived through the switching circuit 16d as a field twice normal speed video signal Sv*. FIG. 4B shows the video signal Sv* which is derived through the switching circuit 16d, in which the field portions corresponding to those of FIG. 4A are marked with the same references. By the way, due to the difference between the write time and the read time, extra or lack of one line amount per field is produced in the video signal Sv*.

In FIG. 4B, at the portions of, for example, the $F_1$ and $F_1$ fields (the portions read out from the memory 16a), 313 lines are not read out because of a time relation. Further, at, for example, the $F_2$ and $F_2$ field portions (the portions read out from the memory 16b), the video signal of one line amount is lacked and during that period, the reading operation is stopped and the video signal of one line amount is lacked (shown by one-dot chain lines). The extra and lack of the video signal of one line amount as mentioned above occur in the vertical blanking period so that in practice, this does not disturb the television picture.

The writing in and reading out from the memories 16a and 16b are controlled by the control circuit 17.

The video signal Sv* derived from the switching circuit 16d is converted to the analog signal by the D/A converter 7 and then fed to the signal processing circuit 8. Then, the red, green and blue primary color signals R, G and B are produced from the signal processing circuit 8 and then fed to the picture receiving tube 9, respectively.

The control circuit 17 produces a vertical synchronizing signal Pv* at the timing shown by arrows in FIG. 4B. More particularly, the vertical synchronizing signal Pv* is produced at the beginning of the first $F_1$ field, at the timing after 312 lines from the preceding line, namely, at the beginning of the second $F_1$ field, at the timing after 311.5 lines from the preceding line, at the timing after 313 lines from the preceding line and at the timing after 313.5 lines from the preceding line, or the beginning of the first $F_1$ field, hereinafter similarly. This synchronizing signal Pv* is supplied through the vertical deflecting circuit 12 to the deflecting coil 13 which then carries out the vertical deflection scanning. When the synchronizing signal Pv* is produced at the above-mentioned timing, in the same $F_1$ field and $F_2$ fields, the scanning lines are formed at the same positions and the scanning lines respectively formed at the $F_1$ field and $F_2$ field are displaced by ½ scanning line spacing each. In other words, the interlaced relation of the video signal Sv is kept as it is.

The video signal Sv* from the D/A converter 7 is supplied to the horizontal synchronizing separating circuit 14. A horizontal synchronizing signal $P_H$* (having the frequency twice the normal frequency) derived from the separating circuit 14 is supplied through the horizontal deflecting circuit 15 to the deflecting coil 13 by which the horizontal deflection scanning is carried out.

According to the example of the television receiver shown in FIG. 3, the horizontal synchronization of the video signal Sv* becomes continuous as shown in FIG. 4B so that the synchronization can be prevented from being disturbed by the insuccessive horizontal synchronization unlike the example of FIG. 1 and thus no picture distortion is produced.

However, in the example of FIG. 3, since the generation timing of the vertical synchronizing signal Pv* is determined such that the scanning lines of the same $F_1$ fields and $F_2$ fields are formed at the same positions (see the arrows in FIG. 4B), the vertical cycle is made different very slightly and not becomes exactly 1/100 second = 10 m sec.

By the way, in the television receiver, in order to correct left and right pincushion distortions, a parabolic wave current with the vertical synchronizing frequency is superposed on the horizontal deflection current. In this case, since the cycle of the vertical synchronizing signal Pv* is different (see FIG. 5A) as mentioned above, also the vertical deflection current becomes correspondingly different (see FIG. 5B). Further, the horizontal deflection current waveform is changed at every vertical cycle (see FIG. 5C). As described above, since the horizontal deflection current waveform is different, a jitter appears in the right and left ends of the picture screen at a fundamental frequency of 25 Hz (four field cycles of $F_1$, $F_1$, $F_2$, and $F_2$). This jitter becomes conspicuous much if the deflection angle becomes larger.

To remove this jitter, it may be considered to correct the horizontal deflection current waveform by the deflecting system. However, the correction thereof is very difficult and requires a special deflection correcting circuit.

In this case, since the cycle of the vertical synchronizing signal Pv* becomes different (see FIG. 5A), also the vertical deflecting current becomes different at every vertical cycle (see FIG. 5B) but this does not exert so serious bad influence on the picture screen.

DISCLOSURE OF INVENTION

The present invention is to prevent a jitter from being produced at the right and left ends of a picture screen without providing a special deflection correcting circuit. To achieve this object, the present invention is to change the read clock frequency for a field memory which forms a converting circuit for converting the field frequency at the unit of vertical cycle and to make each vertical cycle of a video signal read out from the field memory substantially equal. Thus, the horizontal deflecting current waveforms become equal to each other in each vertical cycle so that a jitter can be prevented from being produced at the right and left ends of the picture screen.

BRIEF DESCRIPTION OF DRAWINGS

FIGS. 2A, 2B, 4A, 4B, 5A, 5B and 5C are respectively diagrams useful for explaining the prior art examples, FIG. 6 is a block diagram showing an embodiment of a television receiver according to the present invention, FIG. 7 is a diagram showing a practical example of a PLL circuit.

BEST MODE FOR CARRYING OUT THE INVENTION

Figure 1:
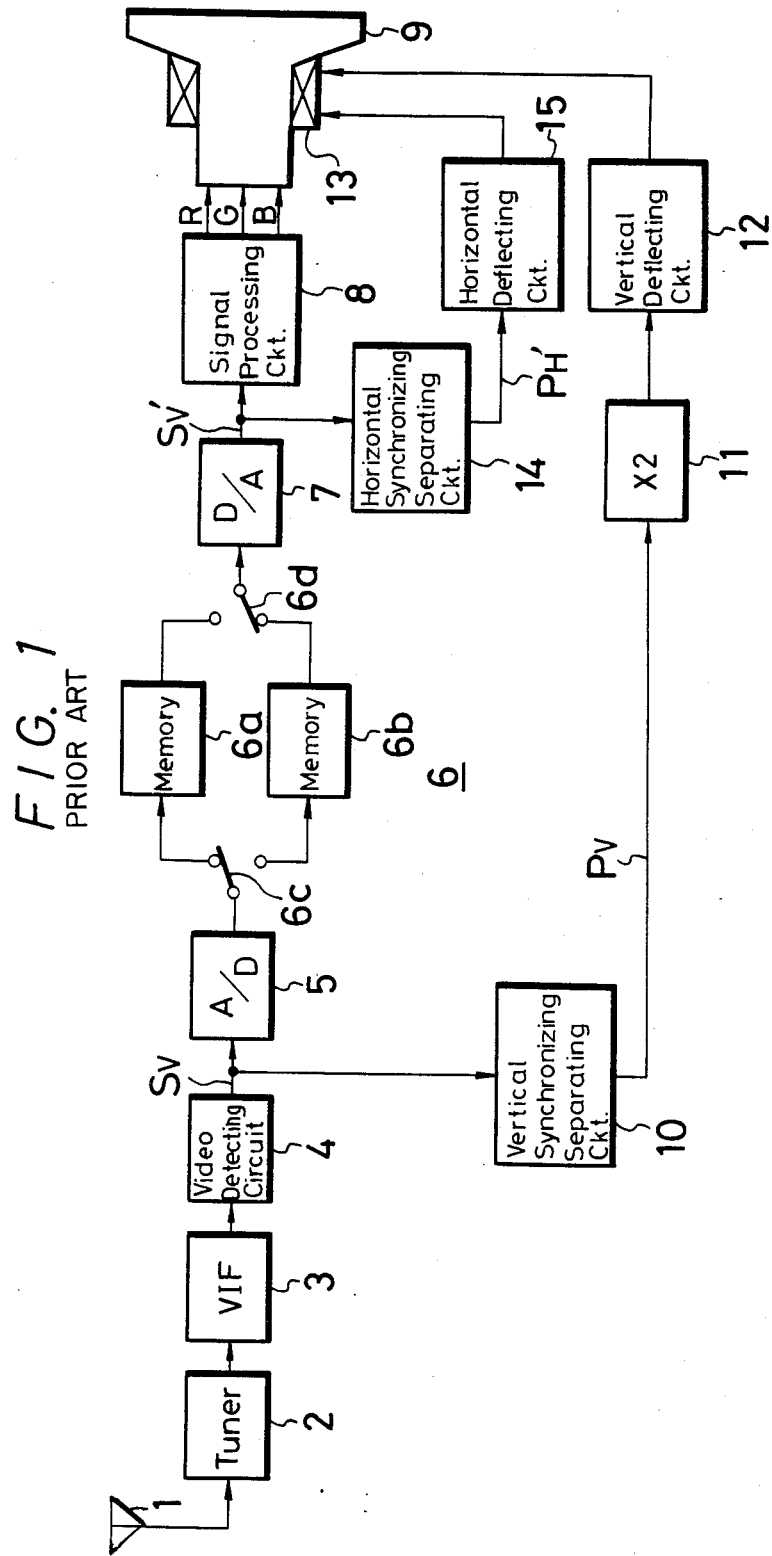
FIGS. 1 and 3 are respectively block diagrams showing prior art examples.
Figure 2A:
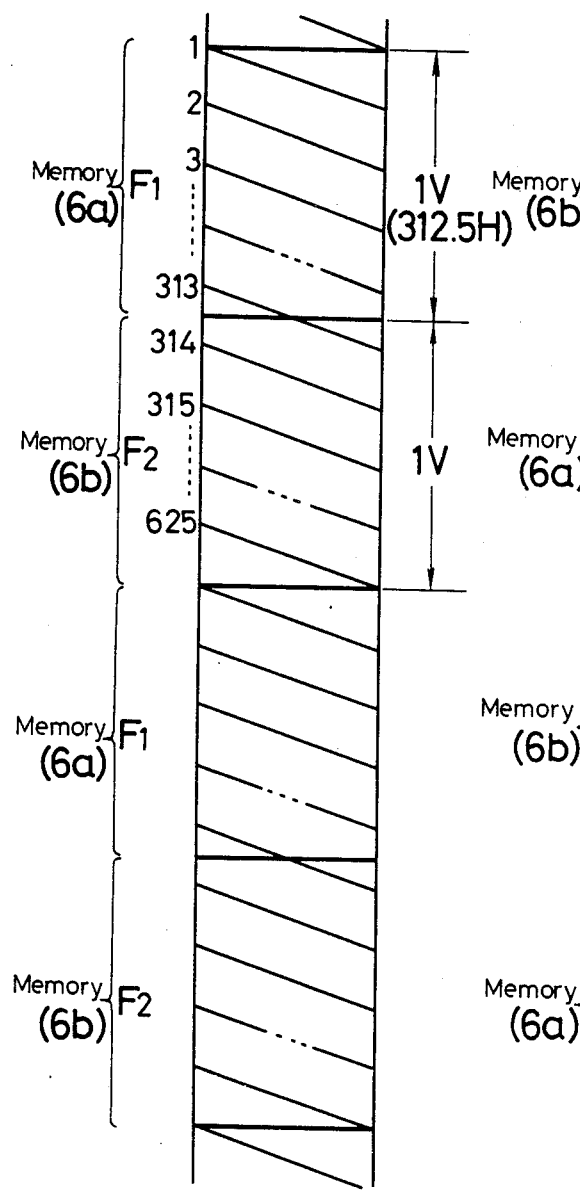
Figure 2B:
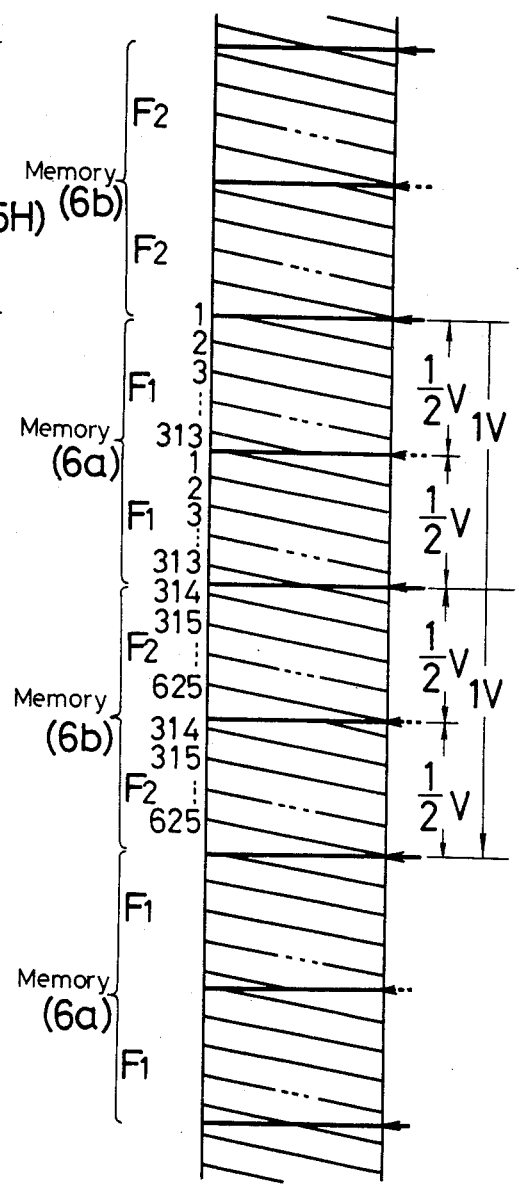
Figure 3:
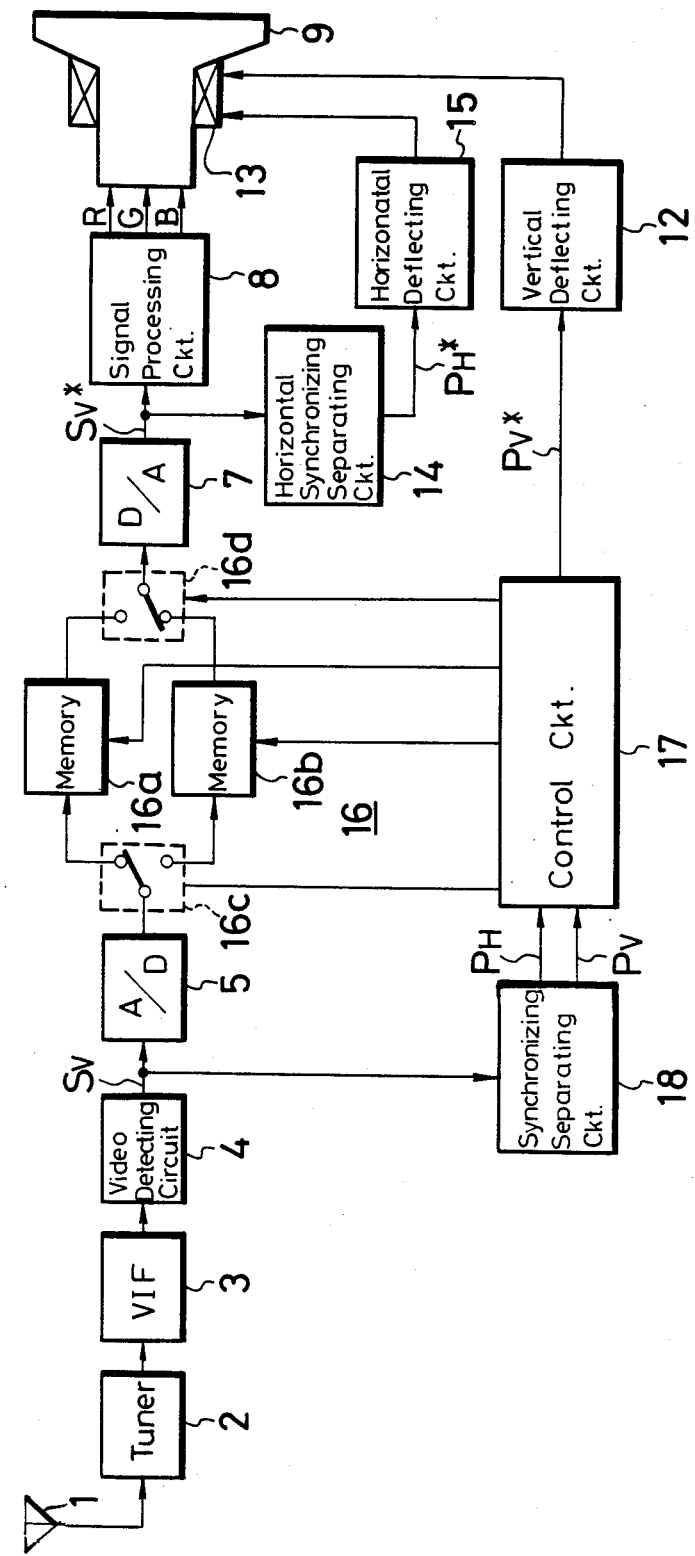

An embodiment of a television receiver according to the present invention will hereinafter be described with reference to FIG. 6. In FIG. 6, like parts correspocding to those of FIG. 3 are marked with the same references and will not be described in detail.

In this embodiment, the duration of the period of 312 lines (hereinafter referred to as A field) from the beginning of the first $F_1$ field, the duration of the period of 311.5 lines (hereinafter referred to as B field) after the preceding period, the duration of the period of 313 lines (hereinafter referred to as C field) after the preceding period and the duration of the period of 313.5 lines (hereinafter referred to as D field) after the preceding period shown in FIG. 4B or the respective vertical cycles become equal to 1/100 sec = 10 m sec.

In FIG. 6, reference numeral 19 designates a PLL circuit. This PLL circuit 19 is supplied with the horizontal synchronizing signal $P_H$ from the synchronizing separating circuit 18 and produces at its output side a signal with the frequency of, for example, 1250 $f_H$ ($f_H$ is the horizontal frequency). This signal is supplied through a frequency divider 20 having a frequency dividing ratio of 2 to a write address counter 21 as its write clock pulse. A write address $W_{AD}$ from the counter 21 is supplied through a switching circuit 22 to the memories 16a and 16b. In this case, the PLL circuit 19 is constructed as, for example, shown in FIG. 7. In the figure, reference numeral 23 designates a phase comparator, 24 a low-pass filter, 25 a voltage-controlled type variable frequency oscillator and 26 a 1/N-frequency divider. In this case, N=1250 is established.

In FIG. 6, reference numerals 27, 28, 29 and 30 designate PLL circuits and they produce read clock pulses $CL_A$, $CL_B$, $CL_C$, and $CL_D$ of A, B, C and D fields, respectively. These PLL circuits 27 to 30 are supplied with the horizontal synchronizing signal $P_H$ from the synchronizing separating circuit 18.

By the way, in this embodiment, since the periods of the A to D fields are made equal to 10 m sec as mentioned above, if the frequencies of the clock pulses $CL_A$, $CL_B$, $CL_C$ and $CL_D$ produced from the output sides of the PLL circuits 27, 28, 29 and 30 are respectively taken as $f_A$, $f_B$, $f_C$ and $f_D$, the following relation is established.

$$f_A:f_B:f_C:f_D = \qquad (1)$$

-continued
$$\frac{312 \text{ lines}}{10 \text{ m sec}} : \frac{311.5 \text{ lines}}{10 \text{ m sec}} : \frac{313 \text{ lines}}{10 \text{ m sec}} : \frac{313.5 \text{ lines}}{10 \text{ m sec}}$$

$$= 624:623:626:627$$

Further, each frequency of these clock pulses $CL_A$ to $CL_D$ is selected to be substantially twice the frequency of the write clock pulse.

Accordingly, in this embodiment, the frequencies $f_A$, $f_B$, $f_C$ and $f_D$ of the clock pulses $CL_A$, $CL_B$, $CL_C$ and $CL_D$ are selected to be 1248 $f_H$, 1246 $f_H$, 1252 $f_H$ and 1254 $f_H$, respectively. In this case, also the PLL circuits 27, 28, 29 and 30 are constructed as, for example, shown in FIG. 7, in which N=1248, 1246, 1252 and 1254 are respectively established.

The clock pulses $CL_A$, $CL_B$, $CL_C$ and $CL_D$ from these PLL circuits 27, 28, 29 and 30 are respectively supplied to a switching circuit 31 and the switching circuit 31 delivers the clock pulses $CL_A$, $CL_B$, $CL_C$ and $CL_D$ during the periods of the A, B, C and D fields. The clock pulse derived from the switching circuit 31 is supplied to a read address counter 32. A read address $R_{AD}$ from the counter 32 is supplied through the switching circuit 22 to the memories 16a and 16b. In this case, of the memories 16a and 16b, the memory set in the write mode by the switching circuit 22 is supplied with the write address $W_{AD}$, while the memory set in the read mode thereby is supplied with the read address $R_{AD}$.

In FIG. 6, reference numeral 33 designates a pincushion distortion correcting circuit, by which a parabolic wave current of vertical synchronizing frequency for use in correcting a pincushion distortion is superposed upon the horizontal deflecting current.

Other circuit elements are formed similarly to those of the example shown in FIG. 3.

This embodiment is constructed as mentioned above, in which during the A, B, C and D fields, the different read clock pulses $CL_A$, $CL_B$, $CL_C$ and $CL_D$ are supplied respectively and the periods of these A, B, C and D fields, or the respective vertical periods become equal to 10 m sec so that the horizontal deflecting current waveform on which the parabolic wave current of the vertical synchronizing frequency for correcting the right and left pincushion distortions in each vertical period is superposed becomes equal, thus removing such a defect that the jitter is produced at the right and left ends of the picture screen unlike the example of FIG. 3. Accordingly, in this embodiment, it is not necessary to provide the special correcting circuit.

By the way, as described above, since the periods of the A, B, C and D fields become 10 m sec equally, the horizontal cycle of each field becomes different. This difference is, however, very small and can be neglected.

Figure 8:
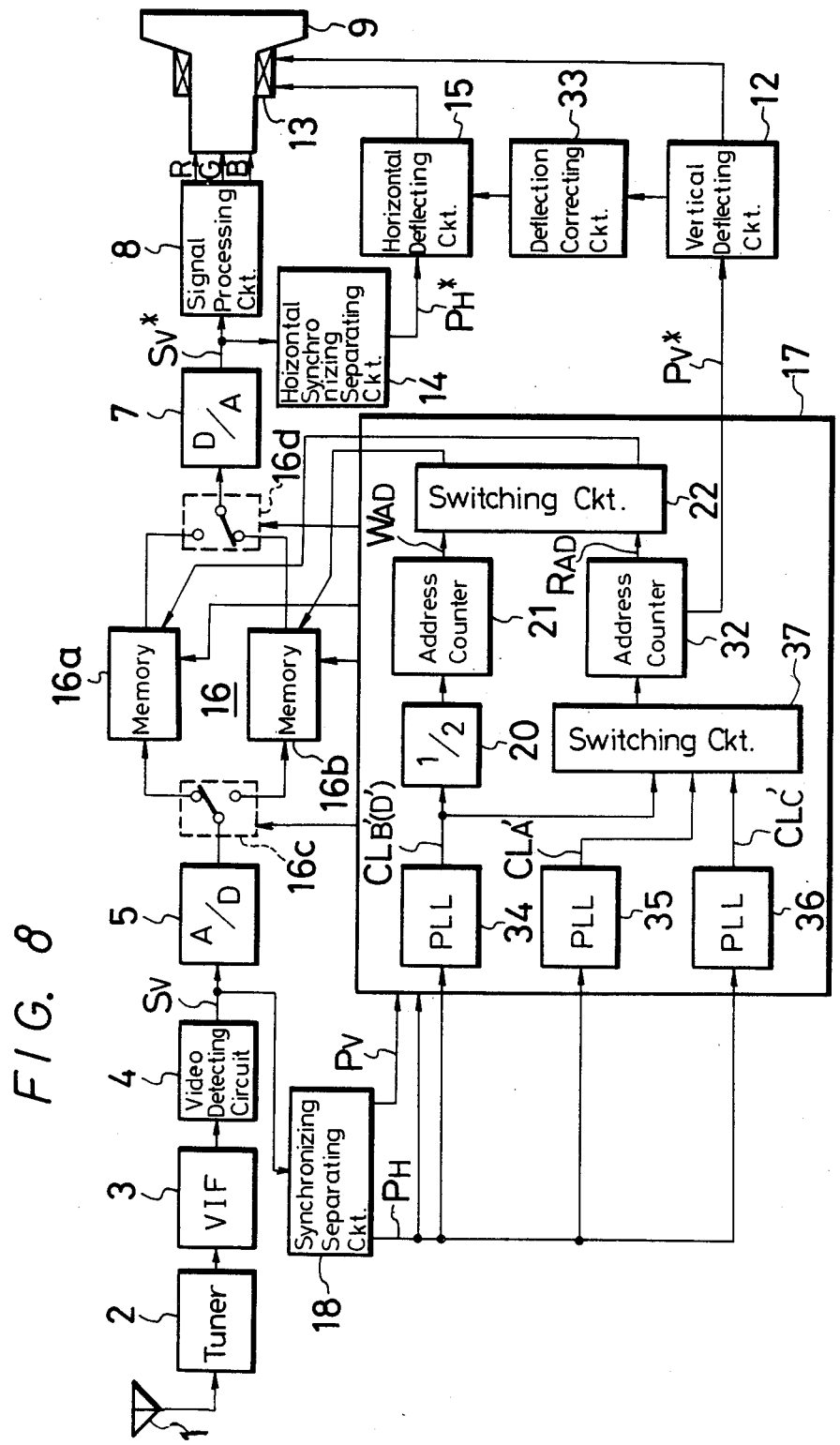
FIG. 8 is a block diagram showing another embodiment of the television receiver according to the present invention and FIG. 9 is a diagram useful for the explanation thereof.

FIG. 8 shows another embodiment of this invention. In FIG. 8, like parts corresponding to those of FIG. 6 are marked with the same references.

Figure 9:
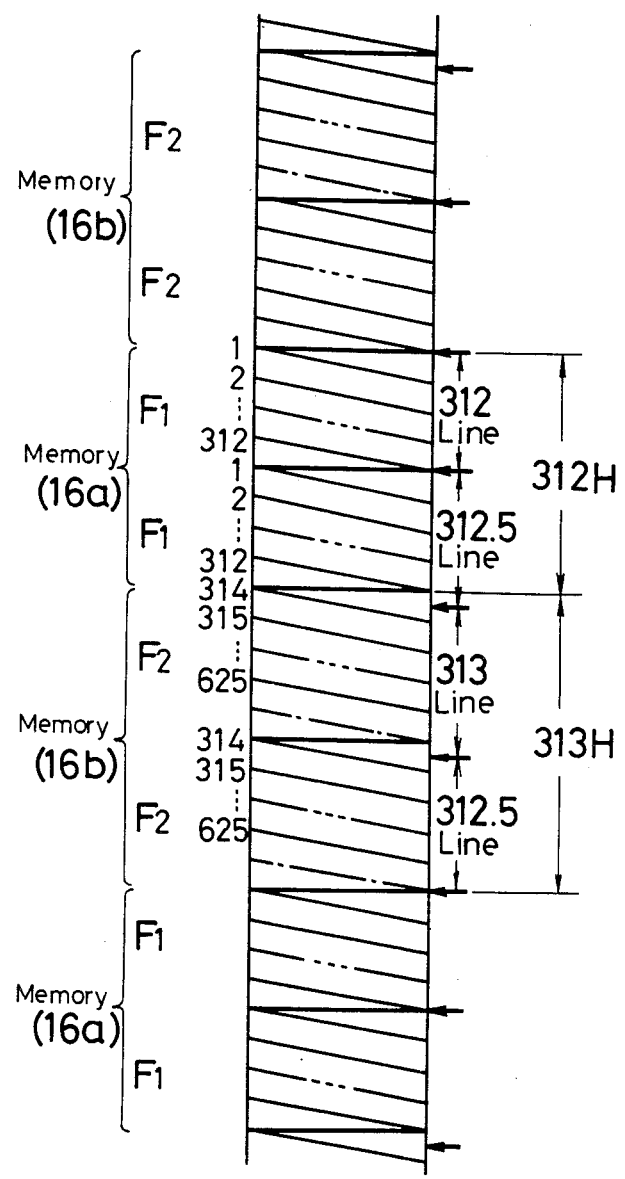

In the embodiment shown in FIG. 8, the timing at which the vertical synchronizing signal $P_V^*$ is produced is selected to be the timing shown by arrows in FIG. 9. That is, at the timing of the beginning of the first $F_1$ field, at the timing with a delay of 312 lines after the preceding timing, at the timing with the delay of 312.5 lines after the preceding timing, at the timing with a delay of 313 lines after the preceding timing and at the timing with a delay of 312.5 lines after the preceding timing, or at the timing of the beginning of the first $F_1$ field and at the similar timing the vertical synchronizing signal Pv* is produced hereinafter.

When the vertical synchronizing signal Pv* is produced at such timings, the scanning line of the F₂ field is displaced upward by one scanning line as compared with the example of FIG. 6. This problem, however, can be solved by delaying the signal supplied to the picture receiving tube 9 by one line amount during the F₂ field or shifting the whole of the signal by one scanning line to the underside during the F₂ field.

In the embodiment of FIG. 8, the duration of the period of 312 lines (hereinafter referred to as A' field) from the beginning of the first F₁ field, the duration of the period of 312.5 lines (hereinafter referred to as B' field) after the preceding period, the duration of the period of 313 lines (hereinafter referred to as C' field) and the duration of the period of 312.5 lines (hereinafter referred to as D' field) after the preceding period, or the respective vertical cycles become 1/100 sec=10 m sec equally.

In FIG. 8, reference numerals 34, 35 and 36 respectively designate PLL circuits which produce read clock pulses $CL_{B'(D)}'$, $CL_A'$ and $CL_D'$ for the periods B'(D'), A' and C'. These PLL circuits 34 to 36 are supplied with the horizontal synchronizing signal $P_H$ from the synchronizing separating circuit 18.

In the embodiment of FIG. 8, since the periods of A' to D' fields become 10 m sec equally, if the frequencies of the clock pulses $CL_{B'(D)}'$, $CL_A'$ and $CL_C'$ produced from the output sides of the PLL circuits 34, 35 and 36 are respectively taken as $f_{B'(D)}'$, $f_A'$ and $f_C'$, the following relation can be established.

$$f_{B'(D)}':f_A':f_C' = \tag{2}$$

$$\frac{312.5 \text{ lines}}{10 \text{ m sec}} : \frac{312 \text{ lines}}{10 \text{ m sec}} : \frac{313 \text{ lines}}{10 \text{ m sec}} = 625:624:626$$

Accordingly, in this embodiment of FIG. 8, the frequencies $f_{B'(D)}'$, $f_A'$ and $f_C'$ of the clock pulses $CL_{B'(D)}'$, $CL_A'$ and $CL_C'$ are respectively selected to be 1250 $f_H$, 1248 $f_H$ and 1252 $f_H$.

The clock pulses $CL_{B'(D)}'$, $CL_A'$ and $CL_C'$ from these PLL circuits 34, 35 and 36 are respectively supplied to a switching circuit 37 and the switching circuit 37 delivers clock pulses $CL_{B'(D)}'$, and $CL_A'$ and $CL_C'$ during the field periods of B'(D'), A' and C'. The clock pulses derived from the switching circuit 37 are supplied to the read address counter 32.

In FIG. 8, the clock pulse $CL_{B'(D)}'$ derived from the PLL circuit 34 is supplied through the frequency divider 20 to the write address counter 21 as the write clock pulse therefor.

Other circuit elements are formed similarly to those of the example shown in FIG. 6.

The embodiment of FIG. 8 is constructed as described above. Accordingly, during the respective B'(D'), A' and C' fields, the different read clock pulses $CL_{B'(D)}'$, $CL_A'$ and $CL_C'$ are supplied respectively so that the periods of respective A', B', C' and D' fields, or the respective vertical periods become 10 m sec equally. Therefore, the horizontal deflecting current waveforms in the respective vertical periods become equal so that it becomes possible to achieve the similar action and effect to those of the example of FIG. 6.

The frequencies of the write clock pulse and the read clock pulse are not limited to those of the above-described embodiments but may be, for example, twice the above frequencies. While in the above-mentioned embodiments the interlaced scanning system of the video system of 625 lines/50 fields and 2:2 is explained, the present invention is not limited to the above system but can be applied similarly to other interlaced scanning system of the other video signal. While in the above-described embodiments the field frequency is selected to be twice, the present invention is not limited to the above field frequency but can be similarly applied to a case in which the field frequency is changed to be three times, four times, . . .

EFFECT OF THE INVENTION

According to the present invention as mentioned above, since the respective vertical cycles are made substantially equal, the horizontal deflecting current waveform on which the parabolic wave current of, for example, the vertical cycle is superposed becomes equal during each vertical period so that the jitter is not produced at the right and left ends of the picture screen. Accordingly, no such special correcting circuit for removing the jitter is required.

We claim:

1. A television receiver cmprising: scan converter means including field-memory means supplied with an input video signal of an interlaced television system having a selected plurality of fields per second, memory control means for supplying writing and reading signals to said field-memory where the frequency of said reading signal is different from that of said writing signal, thereby providing an increased plurality of fields per second greater than said selected plurality of fields, an output terminal for deriving an output video signal; and a video display means supplied with said output video signals, charaterized by a synchronizing signal separating circuit for separating synchronizing signals from said input video signals and by means provided in said memory control means for changing the frequency of said reading signal at a vertical rate including phase-lock loop means receiving said separated synchronizing signals and producing therefrom a plurality of read clock pulse signals of selected different frequencies and a switching circuit receiving said plurality of read clock pulse signals for delivering said plurality of read clock pulses signals to said field-memory means during corresponding periods of respective ones of said increased plurality of fields, whereby vertical intervals of odd fields of said output video signal are made substantially same as vertical intervals of even fields of said output video signal.

* * * * *